Patented Nov. 16, 1943

2,334,526

UNITED STATES PATENT OFFICE 2,334,526

ABRASIVE ARTICLE AND METHOD OF MAKING SAME

Hugh V. Allison, Fairfield, Conn., assignor to The Allison Company, Bridgeport, Conn., a corporation of Connecticut No Drawing. Application May 18, 1942,
Serial No. 443,460

26 Claims. (Cl. 51—299)

This invention relates to new and useful improvements in abrasive articles and to the methods of making the same.

The objects and advantages of the invention will become apparent from a consideration of the following detailed description wherein satisfactory embodiments of the invention are disclosed. However, it is to be understood that the invention is not limited to the details disclosed but includes all such variations and modifications as fall within the spirit of the invention and the scope of the appended claims.

The present invention provides for the better utilization of synthetic rubber copolymers including butadiene in bonds in the abrasive art. I have found that the unsaturated organic chemicals generally used in the manufacture of thermosetting resins or modifications of these resins, are powerful solvents for synthetic rubber copolymers of the type described. These chemicals are not generally solvents of natural rubber.

Organic chemicals the molecules of which are characterized by unsaturation and contain carbon, hydrogen and oxygen are generally useful for my purpose. For example, the unsaturated aldehydes, unsaturated alcohols, unsaturated esters, unsaturated ketones, unsaturated ethers, and certain unsaturated anhydrides exert solvent or plasticizing action on the copolymers mentioned. In general the more unsaturated the molecule the more suited the chemical for the present purpose. This is particularly true where the unsaturation is in conjugated arrangement.

These solvents may be incorporated into the synthetic rubber copolymer including butadiene either to plasticize or dissolve it, the action being dependent on the proportion of the solvent used. Reactive resins may then be incorporated into the plasticized or dissolved synthetic rubber copolymer. These added resins react with the plasticizer or solvent used and therewith form a resin thus eliminating the necessity for removal of the plasticizers or solvents before or during heat treatment of the mixture in the formation of the abrasive articles. Furthermore, depending on the proportion of plasticizer or solvent used the reactive resin is by the described action converted into a thermosetting or semi-thermosetting resin.

While the invention is capable of being adapted to the making of several types of abrasive articles as flexible backed abrasive articles, etc., it finds its greatest value in the manufacture of organic bonded grinding and cutting wheels. Generally these wheels are classified as of the rubber bonded type or of the resinoid bonded type depending on the materials used as the bonding agent. Between these types are those wheels wherein the bond consists of a rubber and resin mixture and wherein the wheel characteristics follow more closely those of the rubber bonded or resinoid bonded type depending on whether the rubber or resin predominates in the mixture. The present invention relates to wheels (and to the methods of making the same) of the rubber bonded type and to wheels wherein the bond comprises a combination of rubber and resin.

The wheels of the invention may be made according to either of the following two general methods of manufacture:

1. The bond is compounded and the abrasive is milled into the bond directly on the milling rolls.

2. The synthetic rubber copolymer is converted to a fluid form and the abrasive, curing agents, and reactive resin are mixed into the copolymer in a paddle or dough type mixer.

According to the present invention (following either of the above general methods) a synthetic rubber copolymer including butadiene is used in making the bond. This material is the "Buna" type synthetic rubbers and is on the market under various names. When the copolymer with the butadiene is acrylic nitrile the material is "Buna" N or "Perbunan" and is sold under other names as "Hycar" or "Chemigun," etc. When the copolymer with the butadiene is styrene the product is known as "Buna" S. While the "Buna" S type of copolymer is less responsive to my solvents than is the "Buna" N type, unlike natural rubber the "Buna" S type does respond and may be used for my purpose.

Synthetic rubber copolymers including butadiene have the common fault of showing little tack while being processed. This is especially troublesome when these copolymers are used for compounding with abrasive material and curing agents directly on milling rolls. Further on curing these synthetic rubbers show little bonding strength with the abrasive grains. For these reasons tacifying and softening agents are added to such copolymers to improve processing and increase cured adhesion as disclosed in my Patent 2,229,880.

In practicing the invention I use the materials above mentioned as plasticizers and/or solvents for the synthetic rubber copolymer. Small quantities of these materials may be used singly, or in mixtures of two or more of the materials, as plasticizers and larger quantities as solvents depending on whether the abrasive material and curing agents are to be distributed through the bond according to the first or second of the general methods outlined.

The mentioned materials, the molecules of which are characterized by unsaturation and contain carbon, hydrogen and oxygen, have the advantage of plasticizing or dissolving the mentioned copolymer for processing purposes plus the quality of potential reactivity with various reactive resins which are or may be incorporated into the mass prior to curing and thus tie the plasticizer or solvent into the mass as part of the bond.

The properties of the finished articles can be controlled (for example their hardness) by the type and quantity of plasticizer or solvent used in connection with the type and quantity of resin used to react such plasticizer or solvent. For example, up to a certain point by increasing the amount of furfural (as the plasticizer or solvent) in proportion to the amount of phenol in the reactive resin the more thermosetting the nature of the bond and the harder the bond obtained.

While furfural has been suggested as the aldehyde used for my plasticizer or solvent for the copolymer of butadiene and acrylic nitrile other unsaturated aldehydes such as acrolein, benzaldehyde, etc., may be used and in addition various unsaturated alcohols as furfuryl alcohol or benzyl alcohol which have resin forming properties may be used as may combinations of these materials as well as the other types plasticizers or solvents mentioned. Furfural is preferred because of its availability and potential chemical reactivity along with its low market cost.

The reactive resin used is chosen according to the properties desired in the finished article. Both natural resins, or their derivatives, as well as synthetic resins or modified types of synthetic resins may be used and the resins may be in either powdered or liquid form. The phenolic or modified phenolic type resins have been found very satisfactory although it is to be understood that other types of resins may be used. For example, urea type resins, resins containing nitrogen such as aldehyde amine resins and melamine resins are satisfactory. Various fillers such as metallic oxides, clays, etc., generally used in the art may be added to the mixture prior to the forming of the abrasive articles.

In the making of an abrasive wheel by the method numbered 1 above I take 100 parts of a synthetic rubber copolymer of butadiene and acrylic nitrile and break it down on a mill while milling into it 10 parts of furfural. The small quantity of furfural is used to plasticize the copolymer and to the plasticized copolymer I add 35 parts of sulphur. Into the described mixture I now mill resin and abrasive grain in accordance with the formula given below. In such formula the bond denotes the plasticized copolymer and sulphur mixture.

|  | Ounces |
|---|---|
| #46 abrasive | 36 |
| #90 abrasive | 15 |
| Resin | 6 |
| Bond | 8.5 |

The resin in this formula is the reactive phenolic type having a phenol to aldehyde ratio of greater than 1 to 1. After thorough mixing to uniformly distribute the abrasive grain and other materials throughout the mass, abrasive wheels are shaped from the mix and cured by heat treatment. Such heat treatment serves to cure the rubber copolymer and to bring about a reaction between the furfural and resin. It is noted in this process that the plasticizer or solvent (the furfural) is not removed from the mass or mix but is reacted with the resin to form a resin constituting part of the bond in the finished article.

The results shown on the following chart were obtained with wheels made from the mixture described immediately above, the wheels being each 12 inches in diameter and three thirty-seconds of an inch thick and the tests being made by cutting one inch cold rolled steel.

| Parts furfural per 100 parts rubber | Vulcanization time in hours | Metal cut, sq. in. | Wheel wear, sq. in. |
|---|---|---|---|
| 10 | 7 | 1.25 | 1 |
| 20 | 7 | 1.18 | 1 |
| 10 | 10 | 1.70 | 1 |
| 20 | 10 | 1.65 | 1 |
| 10 | 15 | 1.90 | 1 |
| 20 | 15 | 1.90 | 1 |
| 10 | 20 | 1.70 | 1 |
| 10 | 24 | 1.40 | 1 |

When no phenolic reactive resin was used in the above formula the ratio of metal cut to wheel wear was lower being .77 square inch to 1 square inch. This shows the added advantage of incorporating the resin into the abrasive mix for the purpose of reacting with the plasticizer or solvent. From the above table it can be seen that varying the length of the curing time also aids in the production of a product of suitable quality. This is probably due to the fact that in the above case a furfural resin is being produced and these are slow curing resins and further the sulphur present tends to retard the resin cure. Increasing furfural over ten percent has no marked advantage and in fact processing difficulties (in the milling operation) are increased by the addition of large amounts of furfural. Reduction of the furfural content below ten percent increases milling difficulties as the copolymer is not softened sufficiently when smaller amounts of furfural are used.

The above example is given only to illustrate the value of the invention in the milling process of manufacture of abrasive wheels. The quantity of sulphur may be varied according to the properties desired in the finished product. In using the copolymer of butadiene and acrylic nitrile the higher the acrylic nitrile content the smaller the quantity of sulphur necessary. Accelerators and other curing agents such as paraform and hexamethylenetetramine may be used.

Heretofore in practicing the general method above numbered 2 natural rubber has been used in three general forms in fluid state in making abrasive articles. They are:

A. Rubber is dissolved in a solvent.
B. Rubber is used in emulsified form as in the various types of latices.
C. Rubber is made fluid by heat degradation.

Use of forms A and B has the disadvantage that volatile agents must be removed before or during the curing of the abrasive articles. This complicates manufacture and slows curing.

In the case of the synthetic rubber copolymers here under consideration they cannot be satisfactorily degraded by heat alone. In addition latices of these copolymers are difficult to obtain of sufficient stability and rubber content for compounding with large amounts of fillers. In the present invention the liquid form of said synthetic rubber copolymers is best obtained by the solvent method. While various solvents of the chlorinated hydrocarbon type form solutions with "Buna" type synthetic rubbers these have the disadvantage that they must be removed during curing or before cure as in the case when solvents such as gasoline are used with natural rubber.

The present invention results in an advantage in that the "Buna" type copolymer is dissolved with a solvent to form a solution and the latter is used to form a bond for and abrasive article without removal of the solvent although it will be understood that the same may be removed if desired.

As above stated unsaturated aldehydes, unsaturated alcohols, unsaturated esters, unsaturated ethers, unsaturated ketones and certain unsaturated anhydrides are plasticizers for "Buna" types synthetic rubber copolymers when used in small quantities but are solvents when used in large quantities. With these solvents agents may be added to the mixture to react with the solvent or solvents, thus eliminating the step of removal of the solvent or solvents during the process of manufacturing and curing the article.

Part of the mentioned solvent may be added to the "Buna" type synthetic rubber on the mill. The material is then removed from the mill and mixed with additional amounts of the plasticizer or solvent in any suitable mixer. In this way a viscous solution is obtained varying in viscosity depending upon the amount of solvent used. For example, four parts furfural to one part of "Buna" N produced a solution of about the consistency of thick molasses. Material of this consistency is suitable for mixing with abrasive grain, resin and curing agents as indicated below. Cements of natural rubber cannot be readily produced with my mentioned solvents.

The following are examples of the manufacture of my improved wheels by the solvent method.

1. A synthetic rubber copolymer of butadiene and acrylic nitrile is first plasticized with a small quantity of furfural on a mixing mill. This plasticized material is then removed from the mill and treated with an additional amount of furfural such that the proportion added (including the quantity added on the mill) is equal to 3 parts of furfural to 1 part of the copolymer to form a heavy viscous mass. A portion of the mass is mixed with resin, curing agents, and abrasive material in a dough type mixer. The resulting mix is pressed or otherwise shaped and cured in the usual manner, the heat curing the copolymer and bringing about a reaction between the furfural and resin to form a resin in the bond. The following proportions may be used:

| | |
|---|---:|
| #90 abrasive | 425 |
| Described synthetic | 8.33 |
| Furfural | 24.97 |
| Resin (phenolic) | 41.7 |
| Sulphur | 2.9 |

2. Satisfactory products have also been prepared by the method given in Example 1 except that a large quantity of furfural is used to increase the ease of mixing. The formula in such case may be as follows:

| | |
|---|---:|
| #90 abrasive | 425 |
| Described synthetic | 7.5 |
| Furfural | 30.00 |
| Resin (phenolic) | 37.5 |
| Sulphur | 2.6 |

In the above examples the method may be varied by mixing the resin and curing agents into the synthetic copolymer before converting the latter to a liquid state and the resin and solvent may be varied as indicated in the earlier part of this specification. Thus it will be seen that within the spirit of the invention the properties of the finished articles may be varied within broad limits by the proper choice of materials and proportions.

It will be understood that in following the first general method above described the mixture formed on the rolls is sheeted and that wheels or the like are cut from the sheets and cured. The curing includes vulcanization of the copolymer and the bringing about of a reaction between the plasticizer or solvent and the added resin.

With certain of the solvent plasticizers of the invention the addition of phenol or other resin to bring about a reaction of the solvent plasticizer into a resin is not necessary. For example furfuryl alcohol may be reacted into a resin by heat or by a catalyst or by heat and a catalyst.

Having thus set forth the nature of my invention, what I claim is:

1. An abrasive article comprising abrasive material and a bond comprising synthetic elastomer copolymer including butadiene and acrylic nitrile, an organic liquid solvent for said copolymer, the molecules of which are characterized by multiple chemical unsaturation and contain carbon, hydrogen and oxygen, and a thermo-plastic resin which will react with said solvent and therewith form a thermosetting resin.

2. An abrasive article comprising abrasive material and a bond comprising a synthetic elastomer copolymer including butadiene and acrylic nitrile, an organic liquid solvent for said copolymer the molecules of which are characterized by chemical unsaturation the unsaturated groupings being arranged in conjugation and contain carbon, hydrogen and oxygen, and a resin which will react with said solvent.

3. An abrasive article comprising abrasive material and a bond comprising a synthetic elastomer copolymer including butadiene and acrylic nitrile, an organic plasticizer for said copolymer the molecules of which contain carbon, hydrogen and oxygen and which molecules are characterized by multiple chemical unsaturation, and a resin which will react with said plasticizer.

4. An abrasive article comprising abrasive material and a bond comprising a synthetic elastomer copolymer including butadiene and acrylic nitrile, an unsaturated aldehyde which will plasticize and dissolve said copolymer, and a resin which will react with said aldehyde.

5. An abrasive article comprising abrasive material and a bond comprising a synthetic elastomer copolymer including butadiene and acrylic nitrile, an unsaturated alcohol which will plasticize and dissolve said copolymer, and a resin which will react with said alcohol.

6. An abrasive article comprising abrasive material and a bond comprising a synthetic elastomer copolymer including butadiene and acrylic nitrile, an unsaturated ketone which will plasticize and dissolve said copolymer, and a resin which will react with said ketone.

7. An abrasive article comprising abrasive material and a bond comprising a synthetic elastomer copolymer including butadiene and acrylic nitrile, furfural to plasticize and dissolve said copolymer, and a resin which will react with said furfural.

8. An abrasive article comprising abrasive material and a bond comprising a synthetic elastomer copolymer of butadiene and acrylic nitrile, and furfuryl alcohol.

9. An abrasive article comprising abrasive material and a bond comprising a synthetic elastomer copolymer including butadiene and acrylic nitrile, and a thermosetting resin formed by reaction of a resin and an organic solvent and plasticizer for said copolymer the molecules of which are characterized by multiple chemical unsaturation and contain carbon, hydrogen and oxygen.

10. An abrasive article comprising abrasive material and a bond comprising a synthetic elastomer copolymer including butadiene and acrylic nitrile, and a thermosetting resin formed by reaction of a thermoplastic resin and an organic solvent plasticizer for said copolymer the molecules of which are characterized by multiple chemical unsaturation and contain carbon, hydrogen and oxygen.

11. An abrasive article comprising abrasive material and a bond comprising a synthetic elastomer copolymer including butadiene and acrylic nitrile and a thermosetting resin formed by reaction of a resin and an organic solvent plasticizer for said copolymer the molecules of which are characterized by chemical unsaturation and contain carbon, hydrogen and oxygen and the unsaturated groupings being arranged in conjugation.

12. An abrasive article comprising abrasive material and a bond comprising a synthetic elastomer copolymer including butadiene and acrylic nitrile, and a resin comprising the reaction product of an unsaturated aldehyde and a resin.

13. An abrasive article comprising abrasive material and a bond comprising a synthetic elastomer copolymer including butadiene and acrylic nitrile, and a resin comprising the reaction product of an unsaturated alcohol and a resin.

14. An abrasive article comprising abrasive material and a bond comprising a synthetic elastomer copolymer including butadiene and acrylic nitrile, and a resin comprising a reaction product of an unsaturated ketone and a resin.

15. An abrasive article comprising abrasive material and a bond comprising a synthetic elastomer copolymer of butadiene and acrylic nitrile, and a resin comprising a reaction product of furfural and a resin.

16. An abrasive article comprising abrasive material and a bond comprising a synthetic elastomer copolymer of butadiene and acrylic nitrile, and a resin comprising the reaction product of furfuryl alcohol.

17. An abrasive article comprising abrasive material and a bond comprising a synthetic elastomer copolymer of butadiene and acrylic nitrile, an organic liquid solvent for said copolymer the molecules of which are characterized by multiple chemical unsaturation and contain carbon, hydrogen and oxygen, and a resin which will react with said solvent.

18. An abrasive article comprising abrasive material and a bond comprising a synthetic elastomer copolymer of butadiene and acrylic nitrile, and a thermosetting resin formed by reaction of a resin and an organic solvent and plasticizer for said copolymer the molecules of which are characterized by multiple chemical unsaturation and contain carbon, hydrogen and oxygen.

19. The method of making abrasive articles comprising mechanically breaking down a synthetic elastomer copolymer of butadiene and acrylic nitrile to soften the same, mixing a small amount of solvent the molecules of which are characterized by multiple chemical unsaturation and contain carbon, hydrogen and oxygen with the synthetic copolymer during the milling thereof to plasticize the same, mixing a resin which is reactive with said plasticizer, curing agents, and abrasive material into the broken down and plasticized copolymer, sheeting the mass thus obtained, shaping articles from the sheet, and directly in such shaped articles reacting the solvent and resin into a resin and curing the copolymer.

20. The method of making abrasive articles comprising mechanically breaking down a synthetic elastomer copolymer of butadiene and acrylic nitrile to soften the same, mixing a small amount of solvent the molecules of which are characterized by multiple chemical unsaturation and contain carbon, hydrogen and oxygen with the synthetic copolymer during the milling thereof to plasticize the same, removing the plasticized copolymer from the mill and reducing it to a solution of the desired consistency by additional amounts of the said solvent, mixing a resin which is reactive with said solvent, curing agents and abrasive material into the copolymer solution, shaping articles from the mass, and directly in such shaped articles reacting the solvent and resin into a resin and curing the copolymer by the use of heat.

21. The method of making abrasive articles comprising mechanically breaking down a synthetic elastomer copolymer of butadiene and acrylic nitrile to soften the same, mixing an unsaturated aldehyde of a character to dissolve said copolymer with the latter, mixing a resin which is reactive with said aldehyde, curing agents, and abrasive material into the copolymer and said aldehyde, shaping articles from said mixture, directly in such shaped articles reacting the aldehyde and resin into a resin and curing the copolymer through the use of heat, and varying the proportions of said aldehyde and first mentioned resin in accordance with the properties desired in said abrasive article.

22. The method of making abrasive articles comprising mechanically breaking down a synthetic elastomer copolymer of butadiene and acrylic nitrile to soften the same, mixing furfural with the copolymer to dissolve the latter, mixing a resin which is reactive with said furfural, curing agents, and abrasive material into the copolymer and furfural, shaping articles from said mixture, directly in such shaped articles reacting the furfural and resin into a resin and curing the copolymer through the use of heat, and varying the proportions of said furfural and first mentioned resin in accordance with the properties desired in the said abrasive article.

23. The method of making abrasive articles comprising mechanically breaking down a synthetic elastomer copolymer of butadiene and acrylic nitrile to soften the same, mixing an unsaturated alcohol of a character to dissolve said copolymer with the latter, mixing resin which will react with said alcohol, curing agents, and abrasive material into the copolymer and said alcohol, shaping articles from said mixture, directly in such shaped articles reacting the alcohol and resin into a resin and curing the copolymer through the use of heat, and varying the proportions of said alcohol and first mentioned resin in accordance with the properties desired in said abrasive article.

24. The method of making abrasive articles comprising mechanically breaking down a synthetic elastomer copolymer of butadiene and acrylic nitrile to soften the same, mixing unsaturated ketone of a character to dissolve said copolymer with the latter, mixing a resin which is reactive with said ketone, curing agents, and abrasive material into the copolymer and said ketone, shaping articles from said mixture, directly in such shaped articles reacting the ketone and resin into a resin and curing the copolymer through the use of heat, and varying the proportions of said ketone and first mentioned resin in accordance with the properties desired in the abrasive articles.

25. The method of making abrasive articles comprising mechanically breaking down a synthetic elastomer copolymer of butadiene and acrylic nitrile to soften the same, mixing furfuryl alcohol with the copolymer to dissolve the same, mixing curing agents and abrasive material into the copolymer and furfuryl alcohol mix, shaping articles from the mass, and directly in such shaped articles reacting the furfuryl alcohol into a resin and curing the copolymer.

26. The method of making an abrasive article comprising mixing a solvent the molecules of which are characterized by multiple chemical unsaturation and contain carbon, hydrogen and oxygen with the copolymer of butadiene and acrylic nitrile to reduce such copolymer to a solution, mixing a resin which is reactive with said solvent, curing agents and abrasive material into the solution, shaping articles from the mass thus obtained, and directly in such shaped articles reacting the solvent and said resin into a resin and curing the copolymer by the use of heat.

HUGH V. ALLISON.